Dec. 6, 1949   G. R. URQUHART, JR   2,490,560
CASTER MOUNTING AND CONTROL MEANS FOR
LANDING WHEELS OF AIRCRAFT
Filed June 20, 1947   3 Sheets-Sheet 2

Inventor:
George R. Urquhart Jr.
By Armington and White
Attorneys.

Dec. 6, 1949 G. R. URQUHART, JR 2,490,560
CASTER MOUNTING AND CONTROL MEANS FOR
LANDING WHEELS OF AIRCRAFT
Filed June 20, 1947 3 Sheets-Sheet 3
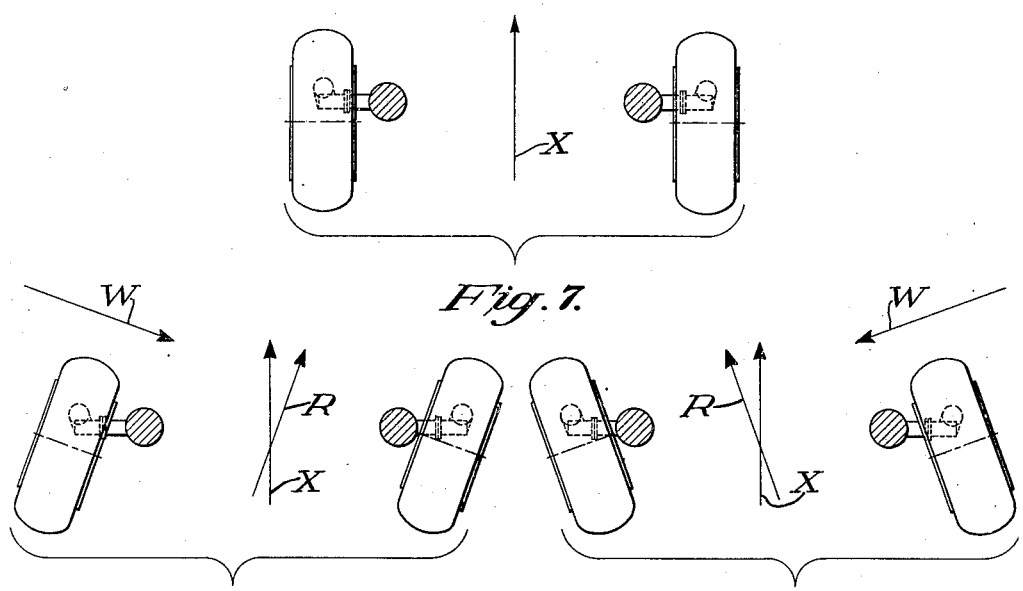
Fig. 7.
Fig. 8.   Fig. 9.
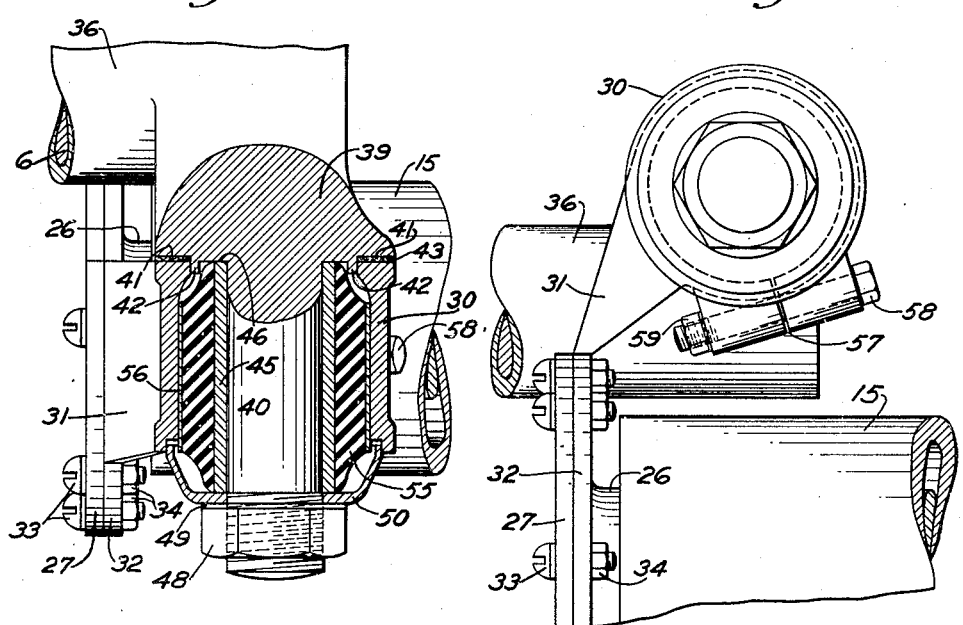
Fig. 5.   Fig. 6.
Inventor:
George R. Urquhart Jr.
By
Attorneys.

Patented Dec. 6, 1949

2,490,560

UNITED STATES PATENT OFFICE 2,490,560

CASTER MOUNTING AND CONTROL MEANS FOR LANDING WHEELS OF AIRCRAFT

George R. Urquhart, Jr., Niagara Falls, N. Y.

Application June 20, 1947, Serial No. 755,921

7 Claims. (Cl. 244—103)

This invention relates to aircraft landing-gear and particularly to an improved mounting for the caster-wheels of airplanes comprising means for controlling their castering action.

One object of the invention is to provide an improved means for mounting the landing-wheels of aircraft to adapt them to caster under effective control during landings or take-offs of the plane to insure greater safety in crosswind conditions.

Another object is to provide an improved mounting for caster-wheels of aircraft to normally maintain them in parallel relation to the longitudinal axis of the plane fuselage while being adapted to caster under torque control and automatically returnable to normal position when out of contact with the runway.

Another object is to provide a caster-wheel mounting and control means of compact construction wholly contained within the recess of the landing-wheel to avoid air resistance and adapt the landing-gear for retraction into relatively small compartments in the fuselage or the motor-nacelles of the plane.

Another object is to provide a caster-wheel mounting and control means therefor adapted to be applied to various types of landing-gear in substitution for the conventional landing-wheel mountings.

Another object is to provide a caster-wheel mounting and control means of light-weight, simple construction and economical cost.

Further objects of the invention are set forth in the following specification which describes a preferred form of construction of the improved mounting and control means as illustrated by the accompanying drawings. In the drawings:

Fig. 5 is an enlarged view of the wheel mounting showing the control means in transverse section taken in the plane of the castering axis;

Fig. 6 is a detailed plan view of the control means for the caster mounting with the hub of the wheel shown in fragmentary section;

Fig. 7 is a diagrammatic view illustrating the normal position of the caster-wheels as in parallelism with the longitudinal axis of the plane;

Fig. 8 is a similar diagrammatic view showing the castering position of the landing-wheels when the plane is headed into a quartering crosswind from the left; and Fig. 9 is a similar diagrammatic view showing the castering position of the landing wheels when the plane is pointed into a crosswind quartering from the opposite or right-hand direction.

It is quite usual for aircraft to make safe landings in moderate crosswind conditions when pilots are experienced in handling heavy equipment. On the other hand, such landings made with moderately light planes guided by less experienced private pilots involve considerable hazard. If the wind condition is severe, the landing requires extreme skill on the part of the pilot from experience not usually acquired in the relatively short periods the average private pilot flies per month. Most airports are constructed with angularly related runways so that planes may be landed in practically all directions as dictated by the direction of the wind. Such airports, however, require large land areas and their construction involves very considerable expense in the building of multiple runways and their maintenance. It is therefore desirable that the cost of land, construction and maintenance of runways and other expenses be conserved to provide for a larger number of airports and to enable them to be located closer to towns and cities in relatively limited areas which may be available.

It is the purpose of this invention to provide means to facilitate the landing and take-off of aircraft in crosswind conditions without special techniques other than that required for normal landings made into the wind; the requirement being that the airplane's path be made parallel to the direction of the runway while the nose of the plane is turned slightly into the wind. The advantages of such a provision applied to aircraft, particularly to light planes, are several: first, as a safety factor; secondly, to allow airports to be limited to a single runway for economy in land area and construction costs; thirdly, as a further safety factor in the case of forced landings where an available field may not be located to permit the plane to be headed directly into the wind; and fourthly, to widen the extent of private flying from existing airports in marginal wind conditions.

To secure the benefits and advantages above noted the present invention contemplates the provision of a mounting for castering the landing-wheels of aircraft in such manner and under such control that the wheels are normally maintained in parallel relation to the longitudinal axis of the plane's fuselage while being adapted to turn about a castering axis under torque resistance and automatically to return to normal position upon their release from contact with the runway.

Figure 1:
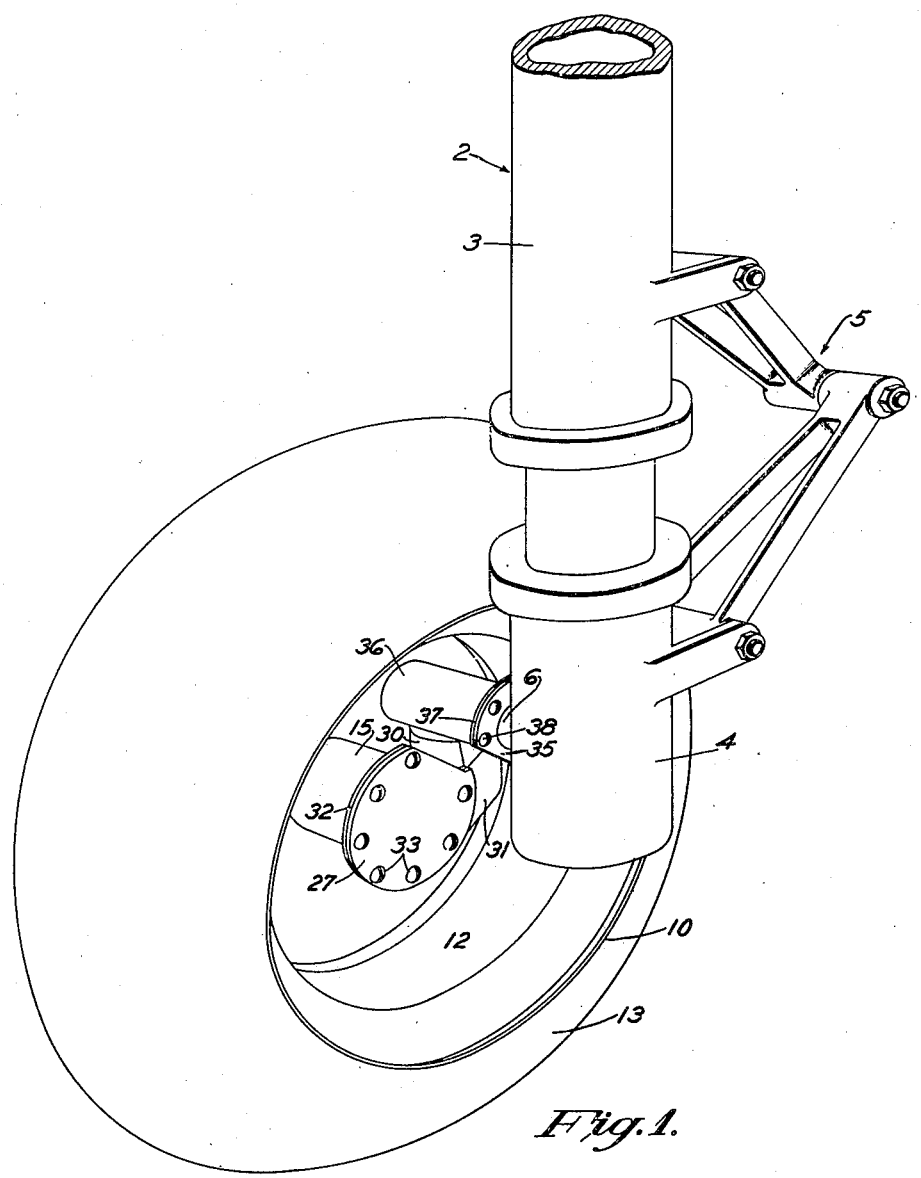
Fig. 1 is a perspective view showing the present improved caster-wheel mounting and control means as applied to one of the vertical struts of an aircraft landing-gear.

Referring to the drawings, Fig. 1 illustrates one of the vertical struts 2 of a plane's undercarriage or landing-gear comprising axially-alined parts 3 and 4 constituting the telescopic elements of a shock-absorber that are maintained against relative rotative motion by means of a linkage indicated generally at 5. The lower element 4 of the strut 2 is usually provided with a lateral arm, such as shown at 6 in Fig. 1, which may be formed with an annular flange for attaching the wheel-bearing thereto.

In the present improved construction the wheel 10 may be of conventional type, except that its single disk 11 is offset laterally sufficiently to provide a recess for the castering device. The dished side disk 11 is formed with an annular flanged rim 12 integral therewith and shaped to mount a pneumatic tire 13. Projecting inwardly from the side disk 11 is an integral, cylindrical hub 15 which may carry cone-shaped races 16 for a pair of anti-friction bearings such as of the roller type shown in Fig. 4. As so far described the undercarriage strut is of conventional design and the landing-wheel of common type except as to the offset position of its disk.

The hub 15 of the wheel 10 is journaled on an axle in the form of a stub-spindle 20 carrying bearing races 21 at either end, between which and the races 16 in the hub are rollers 22 held in suitable cages, not herein shown and described in detail. A washer 23 held on the reduced threaded end 24 of the spindle or axle 20 by means of a nut 25 abuts the end of one of the races 21 to hold it in place, while the opposite corresponding race is located in position by means of a flange 26 integral with the end of the spindle 20. The flange 26 is extended radially in an integral auxiliary flange 27 of much larger diameter provided with a series of circumferentially-spaced bolt-holes. A concavo-convex hub-cap 29 has a flanged rim bolted to the disk 11 of the wheel 10 to provide a cover for excluding dirt or other foreign matter from entering the bearings. Suitable braking means are provided for the landing-wheels, generally comprising a single brake-disk with the operating means controlled from the cockpit of the plane; a showing of such mechanism being omitted from the present drawings for the sake of clarity.

The present improved wheel-mounting and castering control means are embodied in a light-weight compact structure illustrated in connection with the plane's undercarriage in Fig. 1 and shown in detail in Figs. 3 and 4. In general, the mounting comprises a cylindrical bearing 30 formed with a substantially radial projection or castering arm 31 reaching out from its side and terminating in an annular flange 32 having its central opening dimensioned to surround the periphery of the flange 26 on the wheel-axle or spindle 20, see Fig. 4. The flange 32 is bolted to the auxiliary flange 27 which, as before stated, is integral with the flange 26 at the end of the axle 20 and of considerably greater diameter. A series of bolts 33 inserted through holes in the two flanges 27 and 32 with nuts 34 on their ends fixedly connect the wheel-axle 20 with the caster-arm 31 of the bearing 30, see Figs. 2, 3 and 4.

Figure 2:
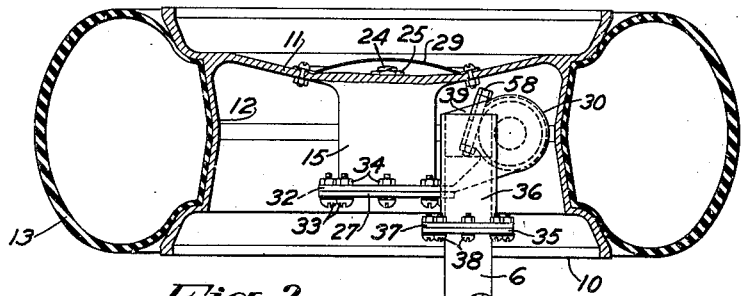
Fig 2 is a transverse sectional view of a side-recessed type of landing-wheel showing the present improved mounting and control means contained within the recess in the side of the wheel.
Figure 3:
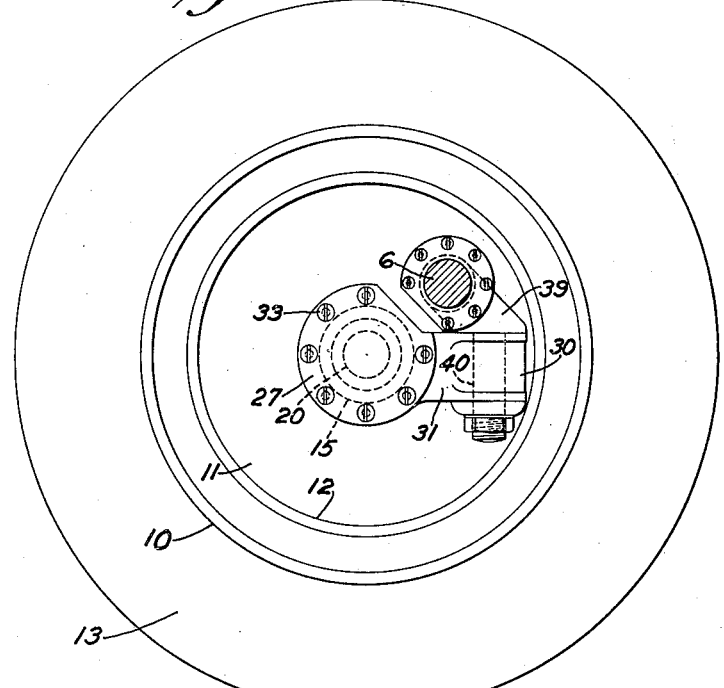
Fig. 3 is a side elevational view of the landing-wheel showing the present improved caster-mounting and control means attached to the flanged axle of the wheel.

As shown more particularly in Figs. 2 and 3, the arm 6, previously referred to as projecting from the undercarriage strut 2, is of cylindrical form and provided with a peripheral flange 35 intermediate its ends. The arm 6 as herein shown constitutes the axle for the conventional landing-wheel and is adapted to serve as a convenient support for mounting the caster-journal or axial spindle of the bearing 30 and its wheel-supporting arm 31. For this purpose a cylindrical sleeve-like member 36 is fitted to the projecting end of the arm 6 on the strut 2, being provided with an annular flange 37 at its end fastened to the flange 35 by means of bolts 38 with suitable nuts at their ends, see Fig. 2. The cylindrical sleeve or supporting member 36 is constructed with an angularly-extending part or arm 39 terminating in a vertical stud or spindle 40, see Fig. 5, formed integral therewith and constituting the caster-journal or king-pin for the bearing 30 and its wheel-mounting arm 31, see Fig. 4. The spindle 40 projects downwardly from an annular seat on the arm or member 39, the outer face 41 of which forms a friction bearing to take the upward thrust of the caster-bearing 30. Referring to Fig. 4, the caster-bearing 30 is provided with a layer of brake-lining material 43 cemented to its upper rim and adapted to bear against the annular seat 41 at the lower end of the arm 39. Radially inward from the bearing seat 41 the arm 39 is formed with a relatively narrow annular projection or flange 42 engaging the bore at the upper end of the bearing 30 to locate the latter concentrically of the spindle 40. Surrounding the spindle 40 with a close fit thereon is a sleeve 45 having its upper end adapted to abut an annular bearing face 46 at the interior of the flange 42 on the arm 39. The lower end of the spindle 40 is formed with screw-threads for receiving a nut 48 which may be tightened against a washer 49 bearing against the end of a cup-shaped cap or closure 50 for the lower end of the bearing 30. The upper rim of the cap 50 fits within an annular groove in the lower widened rim of the bearing 30 with the bearing and cap relatively rotatable about a vertical axis. The washer 49 abuts the lower end of the sleeve 45 and by tightening the nut 48 on the end of the spindle 40 the spindle, sleeve 45 and cap 50 are bound together in a single rigid unit.

The sleeve 45 carries a relatively thick rubber bushing 55 cemented or otherwise fixedly secured to its exterior, the ends of the bushing being preferably tapered toward its periphery as shown in Fig. 5. Enclosing the rubber bushing 55 is a relatively thin metal sheath or covering 56 cemented to its peripheral surface. The outside diameter of the rubber bushing 55 is dimensioned to cause its sheath 56 to fit snugly within the bore of the cylindrical bearing 30 and the bearing is split at 57, see Fig. 6, with a bolt 58 connecting its split ends and a nut 59 for binding the bearing tightly against the bushing assembly.

Figure 4:
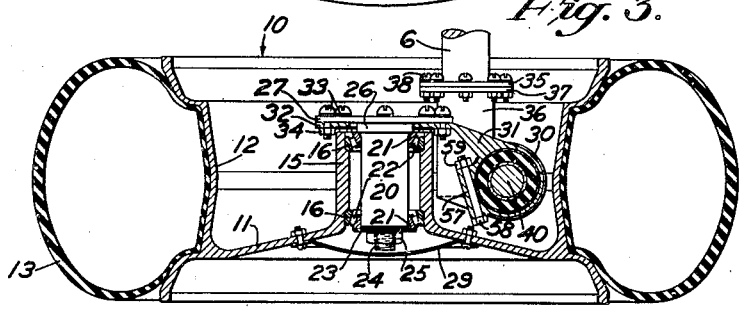
Fig. 4 is a transverse sectional view through the axis of the wheel showing certain elements of the mounting and control means therefor in part-section.

It will be noted by reference to Figs. 2, 3 and 4 that the parts last described provide an especially compact structure for the castering mounting adapted to be wholly contained within the recess in the side of the wheel 10 at the interior of its rim 12. The axis of the caster-spindle 40 is located in the central vertical plane of the wheel 10 at a predetermined distance from the axis of the wheel's axle 20 which is normal thereto. The castering distance between the horizontal axis of the wheel 10 and the vertical caster-axis may be determined in accordance with requirements as controlled by the interior diameter of the landing-wheel rim. Figs. 1 and 2 of the drawings illustrate the parts of the wheel mounting and castering control device when the aircraft is in its normal ground position with the nose of the plane pointing toward the right. In this position the castering axis is vertical and the effective castering length is defined by the horizontal distance between the point of contact of the tire with the ground and the point where the castering axis intersects the plane of the ground. As herein illustrated the castering length is such as to provide for the tail of the plane being raised through an angle of substantially twenty degrees before the castering length becomes zero. In other cases, the castering length may be determined by the size of the plane, the diameter of the landing-wheels and other factors. Suffice it to state herein that the present drawings are to scale representative of an average size light plane.

To apply the present caster-wheel mounting and control means to a plane it is only essential that the undercarriage be provided with the conventional landing-wheel axle, or adapted for the attachment of a similar member. For convenience of description and to avoid confusion the original wheel axle is referred to herein as the arm 6. The conventional axle is usually formed with a peripheral flange such as that shown in the present drawings, but other means may be provided for attaching the caster-bearing and its control means to a strut or other part of the undercarriage of the aircraft. The present improved mounting is designed to replace the mountings for the forward wheels used with conventional types of landing-gear or, in other instances, the mounting may be installed as original equipment. It will be understood that a mounting of the present design is provided for each of the forward landing-wheels used in pairs on aircraft and it will suffice for the present purpose to explain the method of assembling and installing only one of these mountings and its castering control means. When used in pairs the mountings are of identical construction except being of right- and left-hand arrangement.

The entire caster-mechanism is assembled in a complete unit prior to its installation on the aircraft. Preferably, the parts of the device should be assembled sequentially in the order as next explained. First, the wheel axle 20 is inserted through the opening in the flange 32 at the end of the caster-arm 31 and this flange secured to the flange 27 on the axle by means of the bolts 33, seven in number as herein shown. Next, the inner race 21 with its roller-assembly is forced onto the axle 20 in abutting relation to the shoulder of the flange 26.

Referring to Fig. 5, the centering-bushing assembly for the caster-arm journal or bearing 30, comprising the sleeve 45, resilient bushing 55 and its sheath 56, is inserted into the bearing 30 to such an extent as to locate the upper end of the sleeve 45 in horizontal alinement with the upper rim or friction face on the bearing. This setting of the sleeve 45 in relation to the friction face on the bearing 30 prior to the tightening of the clamping bolt 58, see Fig. 6, constitutes the adjusting means for the control of the device. The amount of friction damping imported into the system is directly proportional to the amount of force transmitted through the friction material on the upper face of the bearing 30. Therefore, should it be found that either more or less damping effort is desirable than that provided by the setting of the sleeve 45 as just described, the next-explained procedure may be followed. Should an increase in friction be required the sleeve 45 may be set with its upper end lower than the level of the friction face on the bearing 30 after the bolt 58 has been released. When less friction is required the sleeve 45 is set with its upper end higher than the friction face on the bearing 30; and after either adjustment the bolt 58 is tightened again. The reason for, and the results of, these adjustment procedures will become apparent from the following explanation of the next operations.

After the friction-brake material 43 has been cemented to the upper face of the bearing 30 the caster-spindle 40 is inserted into the sleeve 45 to position the axis of the arm 36 parallel to the axis of the wheel-axle 20, see Fig. 6. The cap 50 and washer 49 are then assembled on the spindle 40 and the nut 48 screwed onto its threaded end.

The purpose of the vertical adjustment previously referred to will now be explained. Since the clamping action of the bolt 58 secures the sleeve 45 relative to the bearing 30, the sleeve also being located vertically as before explained, it can be displaced up or down only by a shearing deformation of the resilient material in the bushing 55. Thus, if more frictional resistance to the turning of the bearing 30 is desired, which means that the sleeve 45 has been located with its upper end below the level of the friction surface on the bearing, when the nut 48 is tightened the spindle 40 will be drawn downward until the friction face 41 on the member 39 will bear against the brake-lining material 43 on the upper rim of the bearing 30. The upper end of the sleeve 45 will not have contacted the face 46 on the member 39, however, until the nut 48 is further tightened to force the sleeve 45 upward to make the contact. It will now be understood that by this procedure the rubber material of the bushing 55 will have been forcibly sheared upward and, due to its resilience, it will react downward on the cap 50, thereby transmitting its reaction to the spindle 40 through the washer 49 and nut 48. In this way, an initial adjustable force can be established between the friction surfaces that is independent of the weight of the plane imposed on the member 39. Obviously, the exact converse of this last-explained procedure will reduce the friction between the supporting-member 39 and caster-bearing 30.

Referring to Fig. 4, after the last-described adjustment has been made the outer bearing races 16 are forced into the wheel hub 15, the second inner race 21 and its roller-assembly placed on the axle 20 and the washer 23 and nut 25 assembled on its threaded end. The dust-cap 29 may now be bolted to the disk 11 of the wheel 10 and the complete castering unit is ready for assembly on the aircraft after the brake-mechanism, not herein illustrated, has been applied to the wheel.

The entire castering unit with its wheel 10 is mounted on the aircraft by sliding the sleeve-member 36 onto the end of the original wheel axle, referred to herein as the arm 6, and bolting the flange 37 on the sleeve to the flange 35 on the arm, see Figs. 2, 3 and 4, with the spindle 40 disposed vertically when the aircraft is in its normal ground position.

The method of operation of the present improved caster-wheel mounting and its control means is explained as follows: The wheel 10 is free to swing about the axis of the caster-journal or spindle 40 as the bearing 30 pivots thereon through an angle of substantially twenty degrees in either direction. The castering action is restrained by the rubber bushing 55 operating between the bearing 30 and spindle 40; with the bushing functioning to normally maintain the wheel in a position parallel with the longitudinal axis of the fuselage of the plane when no side thrust is imposed on the wheel. The pivotal motion of the caster-bearing 30 about the journal 40 is further restrained by the action of dry friction between the bearing surface 41 and the upper rim of the bearing, see Fig. 5, being transmitted through the layer of brake-lining material 43. Since the weight of the aircraft is supported on the member 39 the resistance torque applied through the brake-lining material 43 will be proportional to the coefficient of friction between the material and the bearing face 41 on said member. This frictional resistance to the pivotal motion can be increased or diminished by clamping the sleeve 56 in different vertical positions to vary the bearing pressure of the friction faces, following the procedure explained above. It will be understood that during the assembling of the centering bushing 55 with the caster-arm bearing 30 the tightening of the bolt 58 clamps the sleeve 56 fixedly to the bearing with the sleeve 45 in its predetermined position of adjustment relative to the upper rim of the bearing. Then when the nut 48 is tightened the upper end of the sleeve 45 is clamped against the bearing face 46 to secure the sleeve fast with the member 39. The purpose of applying frictional resistance to the pivoting movement of the caster-bearing 30 is to damp out any tendency of the wheel to shimmy and to resist castering of the wheel when the aircraft is being taxied.

As above stated, the load of the aircraft is carried by the arm or member 39 and transmitted to the caster-bearing 30 through the friction-brake material intervening between the bearing faces of these parts. From the bearing 30 the load is carried to the axle 20 of the wheel 10 by the horizontal caster-arm 31 attached to the axle. The load is transferred from the axle 20 to the wheel 10 through the roller-bearings as in the case of a conventional wheel; it being particularly noted that no load is imposed on the rubber bushing 55, this element being free from the vertical load and functioning solely to resist the castering motion of the arm 31 about the axis of the journal 40 in the bearing 30.

Referring to the diagrammatic views, Fig. 7 illustrates the normal position of the wheels of the aircraft when lowered for landing, both wheels being parallel to the longitudinal axis of the fuselage represented by the line X with the arrow indicating the direction of flight. In Fig. 8 the line X indicates the direction of the longitudinal axis or "heading" of the plane while the direction of the wind is indicated by the line W and the direction of the runway is indicated by the line R. In landing a plane with the wind quartering at an angle to the direction of the runway, for example, blowing from the left as indicated by the line W in Fig. 8, the nose of the plane is pointed slightly into the wind and as the landing wheels contact the surface of the runway the side thrust imposed thereon will cause them to caster to a position parallel with the direction of the runway so that the plane will follow the course of the latter without danger of being diverted therefrom. The same castering action takes place when the direction of the wind is from the right as indicated by the line W in Fig. 9, the wheels being then caused to caster in the opposite direction with the caster-bearing 30 turning counterclockwise about the axis of the spindle 40. The extent of castering motion is determined by the angular relationship between the longitudinal axis of the airplane and the direction of the runway and the castering action is controlled through the rubber bushing 55 with a shearing action on the material of the bushing. In other words, the tendency of the bearing 30 to turn about the axis of the spindle 40, see Fig. 5, causes the rubber in the bushing 55 to be sheared to set up torque resistance to the pivotal motion of the bearing and the castering action of the wheel 10. The resistance to the shearing or circumferential distortion of the rubber of the bushing 55 is augmented by the frictional resistance to the pivoting of the bearing 30 as the brake-lining material 43 acts against the bearing face 41. In this way any tendency of the wheel to shimmy is damped out and the wheels effectually maintained in alinement with the direction of the runway until the course of the plane is checked by braking the wheels. The landing is thus controlled to cause the plane to follow the directional course of the runway and the same castering action of the wheels may function during take-offs to hold the plane to a course following the direction of the runway. In the latter case, immediately the wheels break contact with the ground or runway the rubber bushing 55 in each control device will react to automatically return the wheels into parallel relation to the longitudinal axis of the plane's fuselage and the wheels will remain in this normal position until again making contact with the runway during a landing.

During flight the landing-gear of larger planes is usually retracted into compartments in the fuselage, wings or engine nacelles of the aircraft and it is to be particularly noted that in the present improved construction the compactness of the mounting and castering control means provides for wholly containing the parts within the recess in the side of the wheel so as to avoid wind resistance and, more particularly, to permit retraction of the landing-gear into relatively small compartments which may be of standard dimensions in planes of current design. As another important advantage of the present improved construction, the parts of the device are of relatively light weight, economical to manufacture, and convenient to apply to aircraft of conventional design without material change in their construction.

While the present improved wheel-mounting and castering control means are herein shown and described as embodied in a preferred form of construction, it is to be understood that various modifications may be made in the structure and arrangement of the elements of the mechanism without departing from the spirit or scope of the invention. Therefore, without limiting myself in this respect, I claim:

1. In a caster-mounting and control means for the landing-wheels of aircraft, a caster-journal fast with the undercarriage of an airplane, a caster-arm connected at one end to the axle of the landing-wheel and provided with a bearing at its opposite end pivotally mounted on the caster-journal, means for taking the load of the plane directly and solely on the caster-journal, and a resilient bushing surrounding the caster-journal within the bearing on the caster-arm and held from turning relatively thereto, said bushing acting to normally maintain the caster-arm with the landing-wheel in parallel relation to the longitudinal axis of the fuselage of the plane while permitting limited turning of the caster-arm about the axis of the journal with torque resistance applied thereto.

2. A mounting for the landing-wheels of aircraft comprising a vertical journal fixed to the undercarriage of the aircraft, a caster-arm having a bearing rotatable about the axis of said journal in spaced relation to the periphery thereof, means for attaching the opposite end of the caster-arm to the axle of the landing-wheel, means for supporting the load of the airplane directly and solely from the caster-journal, a rubber bushing confined radially between the journal and the bearing on the caster-arm, said bushing held from turning relatively to said journal and bearing to adapt it to resist the turning motion of the latter while under shearing stress, and friction means between the caster-journal and the caster-arm bearing for further resisting turning motion of said caster-arm to damp out shimmying tendency of the landing-wheel.

3. In combination with the undercarriage of an airplane, a caster-journal fixedly attached thereto, a caster-arm provided with a bearing surrounding the caster-journal in spaced relation thereto, a landing-wheel journaled on the caster-arm, an annular bearing face concentric with the caster-journal for supporting the weight of the airplane directly from said journal, a rubber bushing surrounding the caster-journal within the bearing on the caster-arm, means for confining the bushing between the journal and said bearing to prevent turning of the bushing relatively thereto, and friction braking material between the annular bearing face and the bearing on the caster-arm for resisting turning movement of said arm to prevent shimmying of the landing-wheel.

4. A mounting for the landing-wheels of aircraft comprising a supporting member adapted for attachment to the undercarriage of an airplane, a spindle projecting vertically from said mounting with a horizontal bearing face surrounding its upper end, a cylindrical bearing enclosing the spindle in spaced relation thereto and having a radial caster-arm for mounting the landing-wheel, said cylindrical bearing having a horizontal face on its upper rim, friction braking material between the horizontal bearing face on the member and the horizontal bearing face on the upper rim of the caster-bearing, a sleeve enclosing the caster-spindle with its upper end adjacent the horizontal bearing face on said member, means for clamping said sleeve fast with the supporting member, and a rubber bushing fast with said sleeve and confined within the cylindrical caster-bearing to apply torque resistance to the turning movement of the latter on the spindle.

5. A mounting for the landing wheels of aircraft comprising a member for attachment to the undercarriage of an airplane, said member provided with a vertically-extending spindle and formed with a pair of concentric inner and outer annular bearing faces surrounding its upper end, a sleeve enclosing said spindle with its upper end engageable with said inner annular bearing face at its upper end, a caster-bearing having a radial arm for supporting a journal for the wheel, friction-brake material between the upper end of said caster-bearing and the outer bearing face surrounding the spindle, an annular flange on the member projecting into the bore of the bearing between the annular bearing faces, and a nut on the end of the spindle for clamping the upper end of the sleeve against one of the annular bearing faces on the supporting member to secure the sleeve fast therewith.

6. A mounting for the landing-wheels of aircraft comprising a supporting member attachable to the undercarriage of the airplane, a vertical spindle projecting downwardly from said member, a pair of concentric annular bearing faces on said supporting member normal to the axis of the spindle at the upper end thereof, a sleeve surrounding the spindle, a nut on the spindle for clamping the sleeve with its upper end against the inner annular bearing face on the supporting member, a cylindrical bearing having a castering arm for supporting the axle of the landing-wheel, said bearing enclosing the spindle concentrically thereof in spaced relation to its periphery, a rubber bushing confined between the sleeve and the interior of the caster-arm bearing, and a cap engaging the lower end of the sleeve and held in place by the nut.

7. A mounting for controlling the landing-wheels of aircraft comprising a supporting member adapted for rigid attachment to the undercarriage of an airplane, said supporting member formed with outer and inner concentric horizontal faces, a caster-spindle projecting vertically below said supporting member, a sleeve surrounding said spindle with its upper annular rim engaging the inner horizontal bearing face on the supporting member, a caster-arm for attachment to the axle of the landing wheel and provided with a cylindrical bearing surrounding the caster-spindle with its upper annular rim in spaced relation to the outer horizontal bearing face on said supporting member, resilient means for controlling the rotary movement of the caster-arm bearing about the axis of the spindle, brake-lining material between the upper rim of said cylindrical bearing and the outer horizontal bearing face on the supporting member, a cup-shaped cap at the lower end of the spindle abutting the end of said sleeve and having its peripheral rim engaging the lower end of the bearing, and a nut threaded onto the lower end of the spindle and acting against the lower rim of said sleeve for clamping the upper rim thereof against the inner bearing face on the supporting member.

GEORGE R. URQUHART, Jr.

REFERENCES CITED

The following references are of record in the file of this patent:

UNITED STATES PATENTS

| Number | Name | Date |
| --- | --- | --- |
| 2,267,312 | Smith | Dec. 23, 1941 |
| 2,345,945 | Miner | Apr. 4, 1944 |
| 2,356,468 | Parker | Aug. 22, 1944 |
| 2,394,825 | Trader | Feb. 12, 1946 |

FOREIGN PATENTS

| Number | Country | Date |
| --- | --- | --- |
| 789,814 | France | Aug. 26, 1935 |
| 883,921 | France | Apr. 5, 1943 |